(12) United States Patent
Misawa

(10) Patent No.: US 6,208,380 B1
(45) Date of Patent: Mar. 27, 2001

(54) DIGITAL CAMERA WITH DETACHABLE MEMORY

(75) Inventor: Atsushi Misawa, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 08/916,173

(22) Filed: Aug. 21, 1997

(30) Foreign Application Priority Data

Aug. 21, 1996 (JP) ................................................. 8-219519

(51) Int. Cl.⁷ .............................. H04N 5/76; H04N 5/225
(52) U.S. Cl. ........................ 348/233; 348/375; 348/376; 358/906; 396/321
(58) Field of Search ..................................... 348/207, 231, 348/232, 233, 373, 375, 376; 358/906, 909.1; 396/211, 321; H04N 5/76, 5/225

(56) References Cited

U.S. PATENT DOCUMENTS

| | | | |
|---|---|---|---|
| 4,887,161 | * 12/1989 | Watanabe et al. | 348/233 |
| 5,027,214 | * 6/1991 | Fujimori | 348/233 |
| 5,170,262 | * 12/1992 | Kinoshita et al. | 386/118 |
| 5,436,621 | * 7/1995 | Macko | 340/825.44 |
| 5,442,453 | * 8/1995 | Takagi et al. | 386/118 |
| 5,739,850 | * 4/1998 | Hori | 348/231 |
| 5,742,339 | * 4/1998 | Wakui | 348/233 |
| 5,754,227 | * 5/1998 | Kukuoka | 348/232 |
| 5,790,193 | * 8/1998 | Ohmori | 348/375 |
| 5,815,201 | * 9/1998 | Hashimoto | 348/232 |

* cited by examiner

*Primary Examiner*—Wendy Garber
*Assistant Examiner*—Ngoc-Yen Vu

(57) ABSTRACT

A digital camera stores image data, which represent object images captured via a taking lens and a charge coupled device, in a built-in memory, which is provided in a camera body and which is able to store image data of plural object images. When the built-in memory is filled with the image data, a memory card is inserted into a card slot so that the memory card connects to a card connector, and then the image data stored in the built-in memory are automatically transferred to the memory card. In this case, more than ⅓ of the memory card in the insertional direction is exposed, and hence the camera can be small-sized without being restricted by standards of the memory card.

10 Claims, 4 Drawing Sheets

INSERTED AREA

DIGITAL CAMERA WITH DETACHABLE MEMORY

BACKGROUND OF THE INVENTION

1. Field of the Invention

The present invention relates generally to a digital camera, and more particularly to a digital camera which is provided with a built-in memory for storing image data of plural images.

2. Description of the Related Art

There are two types of conventional digital cameras: in one type, image data representing object images, which are captured via a taking lens and an image pickup device, are stored in a built-in memory. In the other type, image data are stored in an external memory such as a memory card which is inserted and pulled out from the camera body.

In the above-stated conventional digital cameras, the built-in memory and the external memory must have a large capacity in order to increase the number of capturing images. If the built-in memory has a large capacity, the built-in memory is large-sized and high-priced. Thus, the camera is large-sized and high-priced. For this reason, there is a problem in that the digital camera which uses the built-in memory cannot increase the number of capturing images. In order to transfer the image data from the built-in memory to a personal computer, etc., the digital camera must be connected to the personal computer via an interface cable in a complicated manner.

On the other hand, in the case of the digital camera which uses a memory card in accordance with the standards of the Personal Computer Memory Card International Association (a PCMCIA card) for example, which is ordinarily used in a laptop computer, etc., the camera body must be provided with a card slot, which houses the memory card. Thus, the camera cannot be very small.

SUMMARY OF THE INVENTION

The present invention has been developed in view of the above-described circumstances, and has as its object the provision of a digital camera which not only uses an external memory such as a memory card, which can also be small-sized without being restricted by the size of the external memory and which can further easily increase the number of capturing images.

In order to achieve the above-mentioned object, a digital camera of the present invention, which captures object images via a taking lens and an image pickup device, comprises: a camera body; a built-in memory for storing image data representing captured object images, which built-in memory is provided in the camera body; a detachable memory card for storing the image data, which memory card has a larger capacity than the built-in memory; a card slot for receiving the memory card, which card slot is provided on the camera body; a connector for connecting with the memory card, which connector is arranged at an internal end of the card slot; a memory control means for transferring the image data from the built-in memory to the memory card; and in the digital camera of the present invention, when the memory card is inserted into the card slot and connects to the connector, the memory card is partially exposed.

That is, according to the present invention, there is no need to use the memory card during the photographing. Thus, the camera can be small-sized without being restricted by standards of the memory card. If the built-in memory is filled with the image data, the memory card is connected to the connector so that the image data stored in the built-in memory can be transferred to the memory card. Thus, the capacity of the built-in memory does not restrict the number of capturing images.

Moreover, the digital camera of the present invention further comprises: a detecting means for detecting that the connector connects with an external memory such as a memory card; a memory control means for transferring the image data from the built-in memory to the external memory; and in the digital camera of the present invention, when the detecting means detects that the connector connects with the external memory, the memory control means transfers the image data stored in the built-in memory to the external memory and initializes the built-in memory to allow new capturing. That is, if the built-in memory is filled with the image data, the image data can automatically be transferred from the built-in memory to the external memory only by connecting the external memory in the connector. Then, the built-in memory is automatically initialized, and thus new image data can be stored in the built-in memory. Since the transfer of the image data and the initialization of the built-in memory are automatically performed, the complicated operations are not required for the transfer of the image data and the initialization of the built-in memory. Moreover, the important image data can be prevented from being lost by the incorrect operation.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
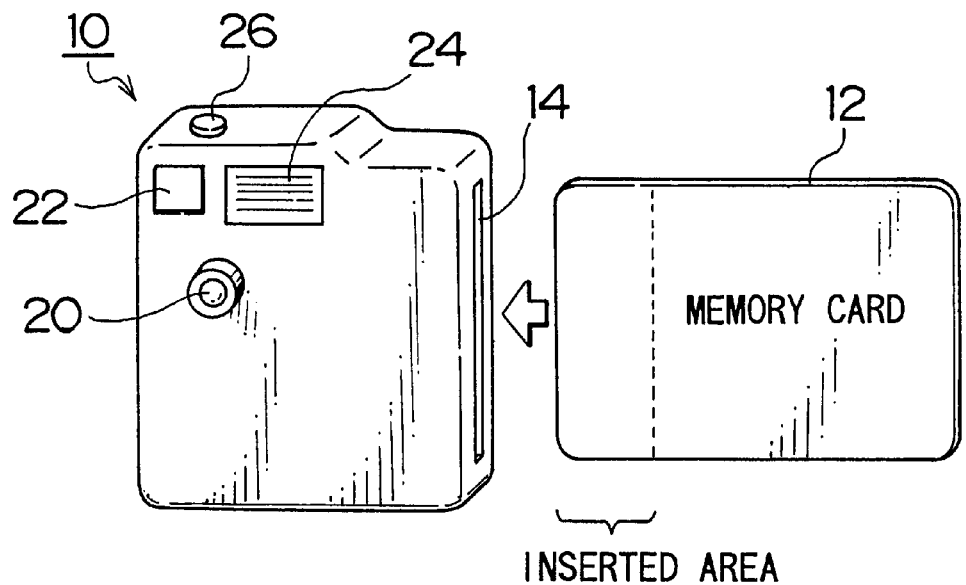
FIG. 1 is a view illustrating an embodiment for the digital camera according to the present invention.
Figure 2:
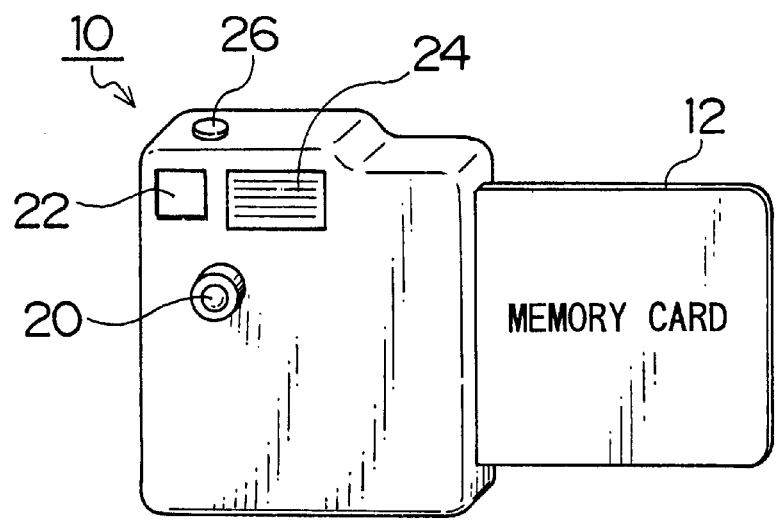
FIG. 2 is a view illustrating the digital camera in FIG. 1 when a memory card is mounted.
Figure 3:
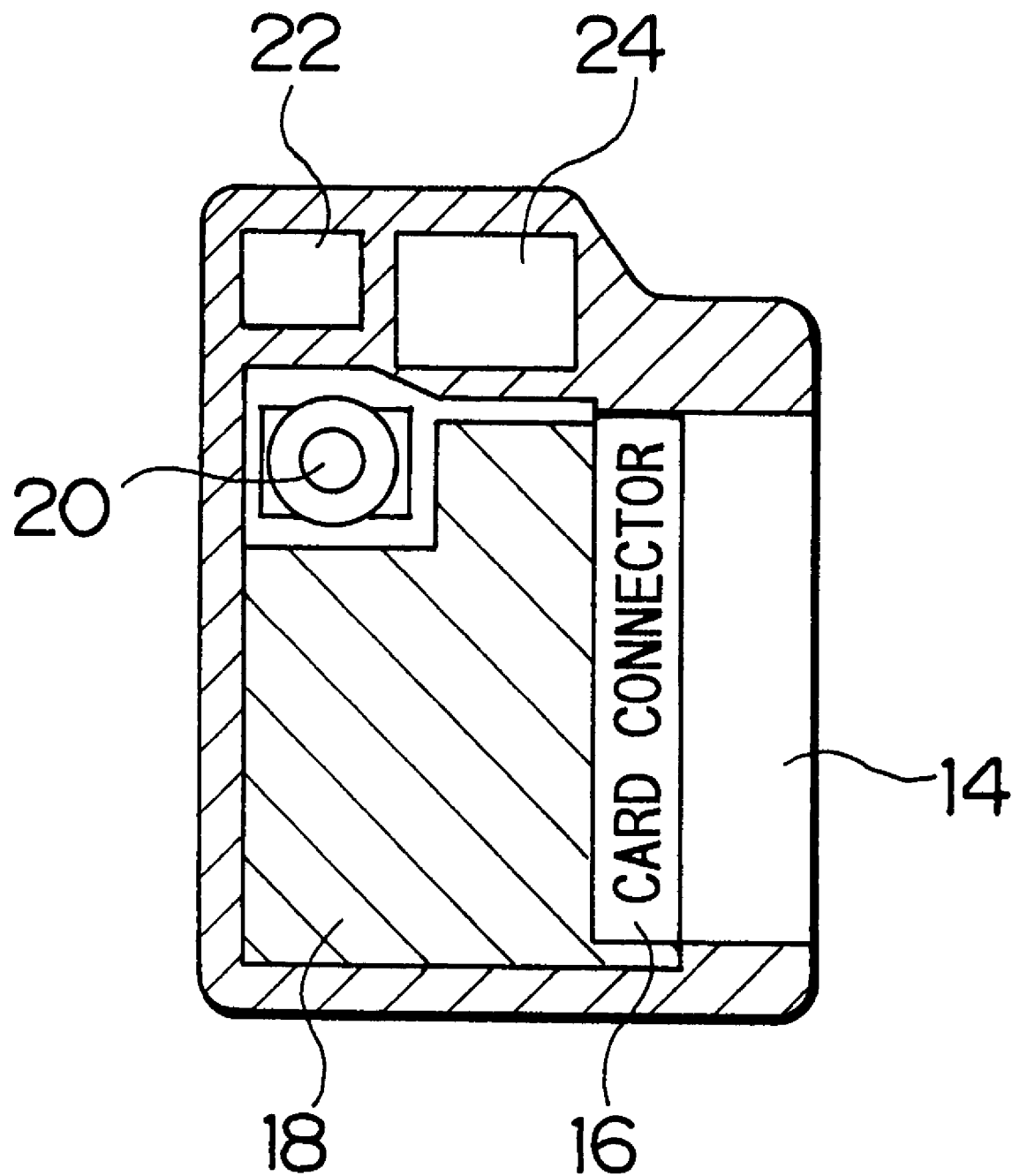
FIG. 3 is a longitudinal sectional view of the digital camera in FIG. 1, including a card slot.

FIGS. 1 and 2 illustrate an embodiment for a digital camera according to the present invention. In FIG. 1, a detachable memory card 12, such as a PCMCIA card, has not yet been inserted in a digital camera 10. In FIG. 2, the memory card 12 has already been inserted in the digital camera 10. FIG. 3 is a longitudinal sectional view of the digital camera 10 including a card slot 14.

As illustrated in the drawings, the digital camera 10 is provided with the card slot 14 on the side thereof. The card slot 14 receives a part (about ¼ of the memory card 12 in an insertion direction shown with an arrow in FIG. 1) of the memory card 12.

As shown in FIG. 3, a card connector 16, which connects with the memory card 12, is arranged at the inner end of the card slot 14. The card connector 16 is mounted on a camera substrate 18, on which a built-in memory and a variety of circuits are mounted.

The digital camera 10 is small-sized as is clear from the comparison with the memory card 12. During the photographing, the memory card 12 is not mounted on the camera 10. Image data, which are captured during the photographing, are stored in a built-in memory, which will be described later. When the built-in memory is filled with the image data, the memory card 12 is connected to the card connector 16 via the card slot 14 so that the image data can be transferred from the built-in memory to the memory card 12.

In FIG. 1, 20 is a taking lens, 22 is a finder, 24 is a strobe light, and 26 is a shutter release button.

Figure 4:
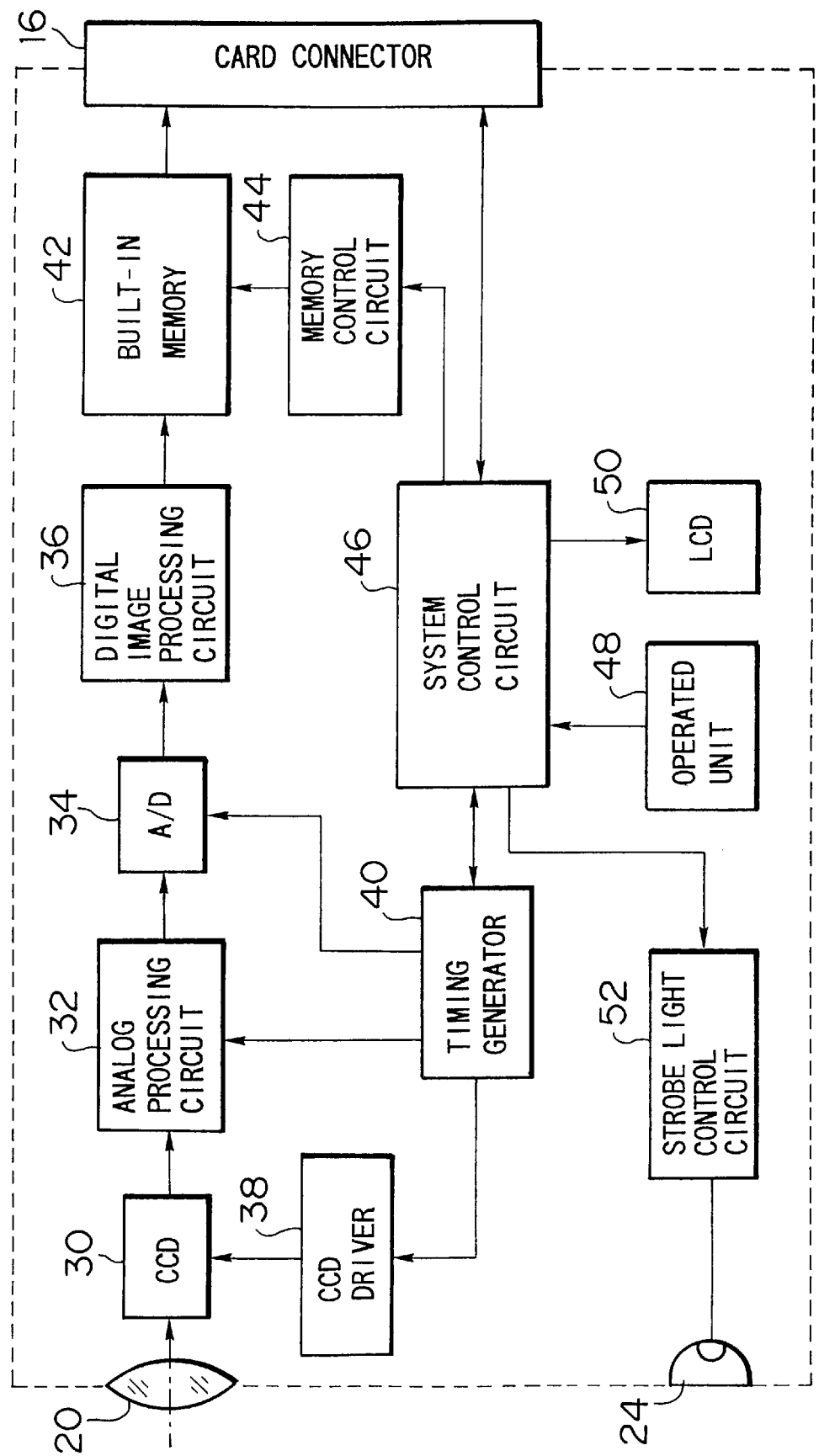
FIG. 4 is a block diagram illustrating the inner construction of the digital camera in FIG. 1.

FIG. 4 is a block diagram illustrating the inner construction of the digital camera 10 shown in FIG. 1. When the shutter release button 26 (see FIG. 1) is pressed, an object image, which is formed on a light-receiving surface of a charge coupled device (CCD) 30 via the taking lens 20, is photoelectrically transduced to electric signals. Each signal is then sequentially read out as a CCD output signal by a driving pulse, which is supplied by a CCD driver 38.

The CCD output signals are sent to an analog processing circuit 32, which includes a CDS cramp circuit, a gain adjusting circuit, a color balance adjusting circuit, etc. After the CCD output signals are analog-processed, the CCD output signals are converted into digital signals by an A/D converter 34, and the converted digital signals are output to a digital image processing circuit 36. According to timing signals, which are supplied by a timing generator 40, the driving pulses are output from the CCD driver 38, and the analog processing circuit 32, the A/D converter 34, etc. are synchronized.

The digital image processing circuit 36 includes a luminance signal generating circuit, a color difference signal generating circuit, a gamma correcting circuit, a data compressing circuit, etc. The digital image processing circuit 36 outputs the image data, which have been processed in the above-mentioned circuits, to the built-in memory 42 (e.g. a flash memory built in the camera 10). The image data are stored in the built-in memory 42 under the control of a memory control circuit 44. The built-in memory 42 has a capacity for storing the image data of plural capturing images (e.g. from ten to dozens). The memory card 12 has a larger capacity (e.g. from forty to one hundred of images) than the built-in memory 42.

A system control circuit 46 unites and controls the circuits in the camera 10. The system control circuit 46 controls the photographing (capturing) of images in accordance with signals from an operated unit 48 including the shutter release button 26. It further controls a liquid crystal display unit (LCD) 50 to display the number of captured images, etc. and controls the strobe light control circuit 52 to control the emission of the strobe light 24. Finally, it controls writing/reading the image data in/out the built-in memory 42 via the memory control circuit 44 and controls the transfer of the image data when the memory card 12 is inserted as described later, and the like.

Next, an explanation will be given about the operation of the digital camera 10.

As stated previously, the digital camera 10 is used during the photographing in such a state that the memory card 12 is not inserted into the card slot 14. The image data, which are captured in each photographing, are stored in the built-in memory 42. The system control circuit 46 makes the LCD 50 display the number of captured images stored in the built-in memory 42, and when the built-in memory 42 is filled with the image data, the system control circuit 46 makes the LCD 50 indicate such (to that effect).

When the built-in memory 42 is filled with the image data, or when the image data stored in the built-in memory 42 are input to a laptop computer, etc., the memory card 12 is inserted into the card slot 14 so that the memory card 12 can be connected to the card connector 16 (see FIG. 2). The system control circuit 46 is able to detect whether the card connector 16 has connected with the memory card 12 or not, for example, according to information from a specific terminal pin of the card connector 16. When the system control circuit 46 detects that the card connector 16 connects with the memory card 12, the system control circuit 46 reads out the image data from the built-in memory 42 via the memory control circuit 44, and stores the readout image data in the memory card 12 via an interface (not shown) and the card connector 16. After the transfer of the image data stored in the built-in memory 42 is completed, the system control circuit 46 clears the built-in memory 42 and initializes the number of captured images, etc. displayed on the LCD 50, and thus preparing for the new capturing (photographing).

Figure 5:
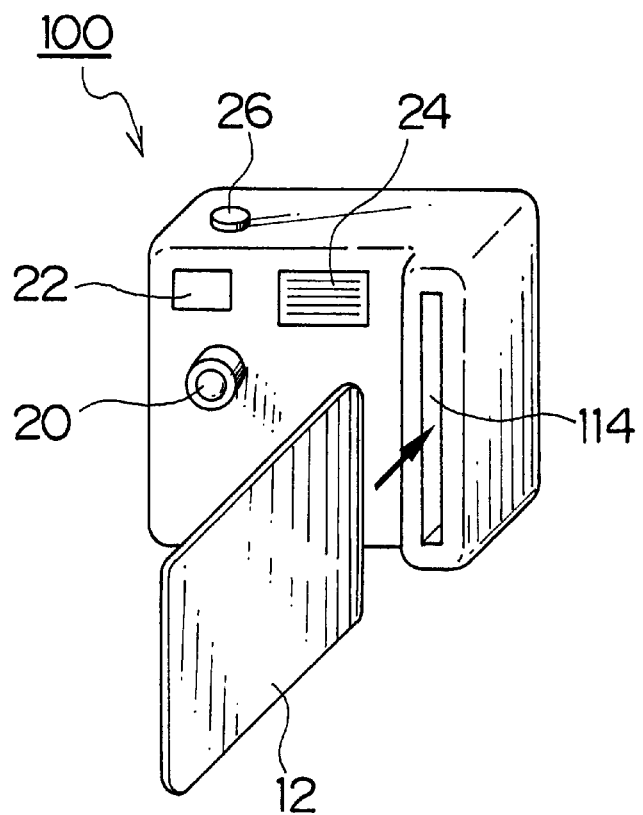
FIG. 5 is a view illustrating another embodiment for the digital camera according to the present invention.

FIG. 5 is a view illustrating another embodiment for the digital camera according to the present invention. Parts similar to those in FIG. 1 are denoted by the same reference numerals, and a detailed explanation of them will be omitted.

Figure 6:
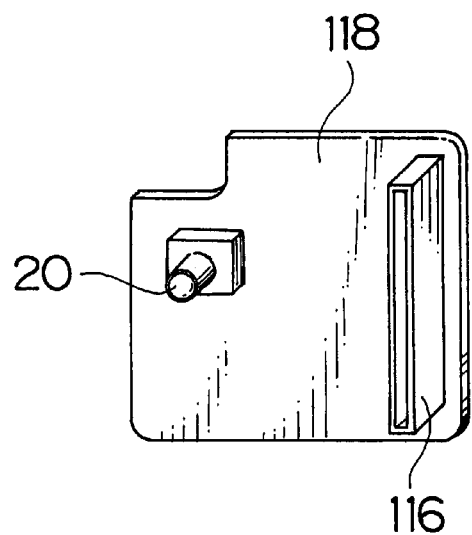
FIG. 6 is a view illustrating a camera substrate of the digital camera in FIG. 5, including a card connector, etc.

As shown in FIG. 5, the digital camera 100 is provided with a card slot 114 such that the insertional direction of the memory card 12 can be parallel to the optical axis of the taking lens 20. Hence, as shown in FIG. 6, the camera substrate 118, on which the card connector 116 is mounted, can have a larger mount area than the camera substrate 18 in FIG. 3.

As is the case in the embodiment described in FIGS. 1, 2 and 3, the memory card 12 is connected to the card connector 116 and is inserted into the camera 100 by about ¼ thereof in the insertional direction. The present invention, however, is not restricted to this. At least, the memory card is inserted in such a state that more than ⅓ thereof in the insertional direction is exposed so that the user can grasp the memory card by the exposed part with fingers to pull it out. In these embodiments, the image data output from the built-in memory are relayed by the memory card; however, the camera body may be further provided with an NTSC video output terminal and/or a digital output terminal (e.g. RS-232C).

As set forth hereinabove, according to the digital camera of the present invention, there is no need to use the memory card during the photographing. Moreover, the whole memory card does not have to be housed in the camera body when the image data are transferred from the built-in memory to the memory card. Hence, a small-sized camera can be made without being restricted by the standards of the memory card. The image data are transferred from the built-in memory to the external memory such as the memory card, etc., and thus the capacity of the built-in memory can be relatively small. The built-in memory can be small-sized and low-priced, and the camera body can also be small-sized, lightweight and low-priced, as a result.

Furthermore, according to the present invention, when the external memory is connected to the connector of the camera, the transfer of the image data stored in the built-in memory and the initialization of the built-in memory are automatically performed. For this reason, the complicated operations are not required for the transfer of the image data and the initialization of the built-in memory, and the important image data can be prevented from being lost by the incorrect operation.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A digital camera for capturing images, comprising:
    a camera body;
        a built-in memory for storing image data representing captured images, said built-in memory being provided in said camera body;
    a detachable memory card for storing image data, said detachable memory card having a larger storage capacity than said built-in memory;
    a card slot for receiving said detachable memory card, said card slot being provided in said camera body;
    a connector for connecting with said detachable memory card, said connector being arranged in said card slot; and
    memory control means for transferring image data from said built-in memory to said detachable memory card,
    wherein said detachable memory card is for attachment when the digital camera is not being used to capture images and is detached when the digital camera is being used to capture images and when said detachable memory card is inserted into said card slot and connects to said connector, more than ⅓ of said detachable memory card is exposed in an insertional direction of said detachable memory card.

2. The digital camera as defined in claim 1, further comprising detecting means for detecting that said connector connects with said detachable memory card, and wherein when said detecting means detects that said connector connects with said detachable memory card, said memory control means automatically transfers the image data stored in said built-in memory to said detachable memory card and initializes said built-in memory to allow for new image capturing.

3. The digital camera as defined in claim 1, wherein said camera body the insertional direction of said detachable memory card is shorter than said detachable memory card in the insertional direction of said detachable memory card.

4. The digital camera of claim 1, wherein when said detachable memory card is inserted into said card slot and connects to said connector, said detachable memory card is partially exposed so that a user can grasp said detachable memory card by the exposed part to remove said detachable memory card from said camera body.

5. The digital camera of claim 1, wherein a part for guiding said detachable memory card in said card slot is shorter than ⅔ of a length of said detachable memory card in the insertional direction of said detachable memory card.

6. A digital camera for capturing images, comprising:
    a camera body;
        a built-in memory for storing image data representing captured images, said built-in memory being provided in said camera body;
    a detachable memory card for storing image data, said detachable memory card having a larger storage capacity than said built-in memory;
    a card slot for receiving said detachable memory card, said card slot being provided in said camera body;
    a connector for connecting with said detachable memory card, said connector being arranged in said card slot; and
    memory control means for transferring image data from said builtin memory to said detachable memory card,
    wherein said detachable memory card is mainly for attachment when the digital camera is not being used to capture images and is normally detached when the digital camera is being used to capture images, with the digital camera being usable to capture images when the detachable memory card is both attached and detached, and wherein when said detachable memory card is inserted into said card slot and connects to said connector, more than ⅓ of said detachable memory card is exposed in an insertional direction of said detachable memory card.

7. The digital camera as defined in claim 6, further comprising detecting means for detecting that said connector connects with said detachable memory card, and wherein when said detecting means detects that said connector connects with said detachable memory card, said memory control means automatically transfers the image data stored in said built-in memory to said detachable memory card and initializes said built-in memory to allow for new image capturing.

8. The digital camera as defined in claim 6, wherein said camera body, in an insertional direction of said detachable memory card, is shorter than said detachable memory card in the insertional direction of said detachable memory card.

9. The digital camera as defined in claim 6, wherein when said detachable memory card is inserted into said card slot and connects to said connector, said detachable memory card is partially exposed so that a user can grasp said detachable memory card by the exposed part to remove said detachable memory card from said camera body.

10. The digital camera as defined in claim 6, wherein a part for guiding said detachable memory card in said card slot is shorter than ⅔ of a length of said detachable memory card in the insertional direction of said detachable memory card.

* * * * *